UNITED STATES PATENT OFFICE.

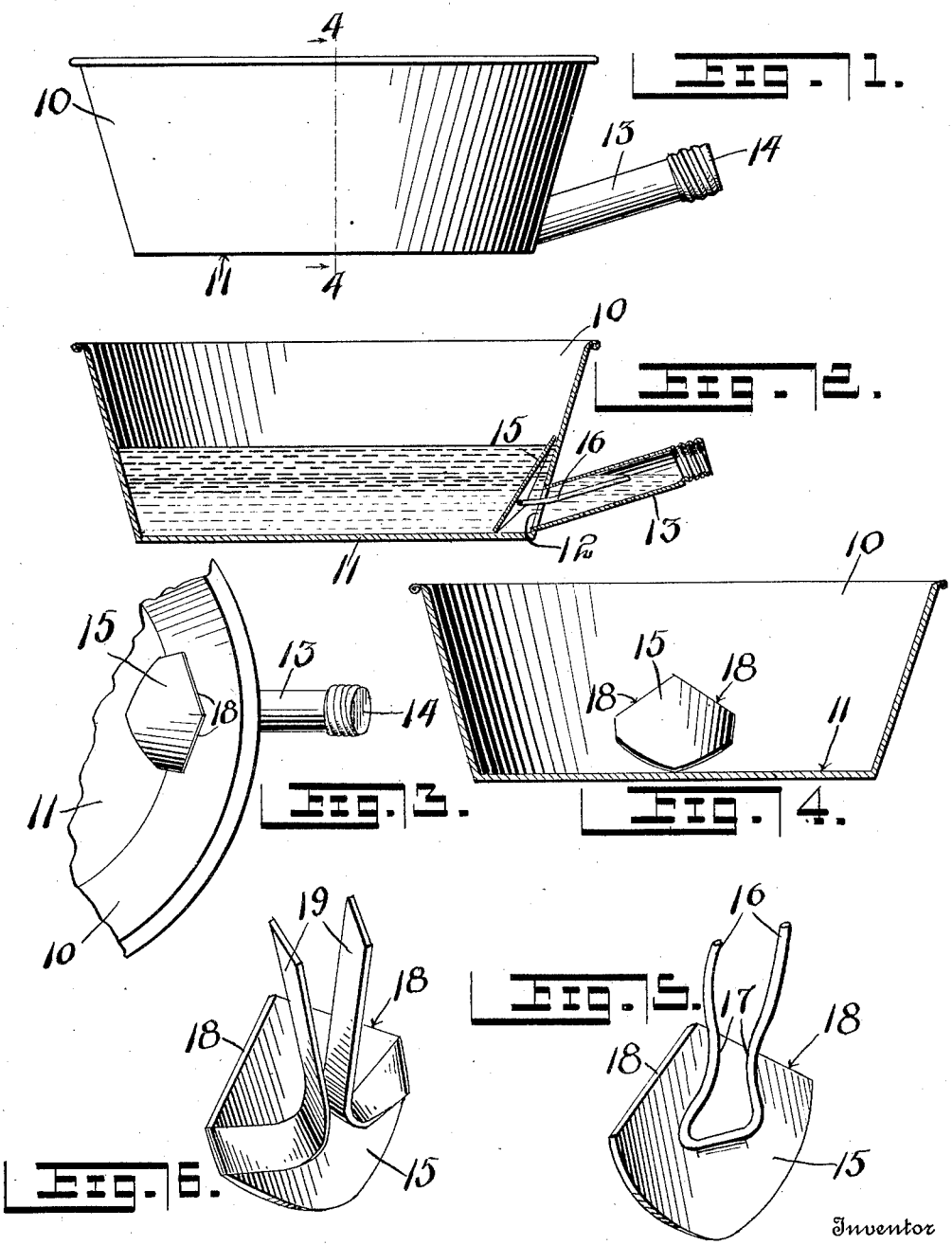

HUGH C. HARRIS, OF COEUR D'ALENE, IDAHO.

SELF-SKIMMING MILK-PAN.

1,089,552. Specification of Letters Patent. Patented Mar. 10, 1914.

Application filed December 27, 1912. Serial No. 738,910.

*To all whom it may concern:*

Be it known that I, HUGH C. HARRIS, a citizen of the United States, residing at Coeur d'Alene, in the county of Kootenai, State of Idaho, have invented certain new and useful Improvements in Self-Skimming Milk-Pans; and I do hereby declare the following to be a full, clear, and exact description of the invention, such as will enable others skilled in the art to which it appertains to make and use the same.

This invention has special reference to milk separators or skimmers and more particularly to a self-skimming milk pan.

The invention is designed as an improved and simple device in the form of a pan or receptacle adapted to receive the milk and provided with a spout which after the milk has set for the purpose of raising the cream, will serve for draining off the milk but to permit the retention of such quantity of milk within the pan as to support the cream thereon owing to its decreased specific gravity, whereby the escape of part of the cream with the milk is prevented.

It is further an object of the invention to overcome the objections of creaming cans having spouts positioned horizontally and whose outlet ends are located on a line with or below their inlet ends, thus preventing any escape of the cream by causing the flow of the milk to stop when the level thereof has reached the lowest point of the outlet of the spout, so that an increase in cream production is accomplished without the use of a separating machine.

Another object of the invention is to provide a shield which prevents the suction created by the escape of the milk from scattering the cream or from drawing it off, the shield being removable whereby the pan may be maintained in a perfectly clean and sanitary condition, such as is especially necessary in connection with the treatment of milk.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 1 is a side elevation of a self-skimming milk pan constructed in accordance with the invention. Fig. 2 is a vertical sectional view thereof taken through the spout, and with the screw cap of the spout removed, the milk being shown supporting the cream, after the milk has obtained a level wherein further escape of the milk will not take place. Fig. 3 is a top plan view of the device, only a fragmentary portion of the pan being shown. Fig. 4 is a vertical sectional view taken on the line 4—4 of Fig. 1. Fig. 5 is a detail perspective view of a shield member employed with the device. Fig. 6 is a similar view of a modified form of shield member.

In illustrating the preferred embodiment of the invention, there is shown a pan or receptacle 10 which though preferably of circular contour or cross section, may be of any other preferred form. Located near or at the bottom 11 of the pan and through one side thereof, is an escape opening 12, the same having a spout 13 communicating therewith. It will be observed that this spout is disposed in an inclined position, being raised at its outer end so that the outlet of the spout at its lowest point is considerably above the bottom of the pan and a fraction higher than the top portion of the opening or inlet end of the spout. The purpose of this arrangement will be hereinafter shown.

The outer end of the spout is threaded to receive a screw cap or other closure 14 which is in position, while the milk is being poured into the pan until the cream has set or raised, owing to the difference in specific gravity between the cream and the milk, the former being the lighter. This cap is removed during the time that the milk is being drained from the pan to retain the cream therein but is again applied when the separating process has been completed.

A shield 15 in the form designated by the word, and convexed inward, is provided to prevent the suction caused by the escape of the milk from draining off the cream or scattering the same. In order to secure the shield over the inlet end of the spout and to permit it to be readily detached to facilitate cleaning of the pan and parts, a section of steel spring wire 16 is anchored to the concaved side of the shield or plate forming the same, the same being bent in substantially U-form and having a restricted portion 17 and spaced free ends serving to retain the shield in position.

It will be observed that the inclined top edges 18 of the shield will contact with the inner wall of the pan, the bottom edge of the shield resting on the bottom of the pan so that spaces are left at either side for the escape of the milk without causing an eddy and thereby preventing the cream from being drawn off. As a modified form of means for holding the shield in position, its opposed or side edges are provided with integral spring tongues 19 which are bent inwardly and then spaced apart at their free ends for the retention of the shield by outward pressure against the surrounding wall of the spout when engaged therein, in a manner similar to the holding means heretofore described.

In the operation or use of the device, with the spout closed by the cap and the shield in position, milk is poured into the pan and allowed to set sufficient time to cause raising of the cream, the time required being ascertained by practice, such as by appearance of the cream. The cap is then removed, a suitable receptacle being disposed beneath or in front of the spout to catch the milk as the latter exudes therefrom, the milk at the same time serving to buoy up the cream as has previously raised and become separated therefrom by gravity.

Owing to the specific position of the spout, when the milk ascertains a level in the pan coincident with the top of the inlet end of the spout or opening 12, certain of the milk will be disposed within the spout and will be located on a plane below the lowest point at the outlet end of the spout and further escape thereof will be prevented. A small amount of milk being thereby left in the pan, the cream which is of less specific gravity, will be supported thereon, such milk also serving to prevent the cream from adhering to the pan, as well as to prevent any small particles of the cream from escaping. It has been found by actual practice that in skimming milk considerable of the cream is always lost and with the exception of the very costly separating machines, the present device is especially serviceable in quickly and efficiently skimming the milk, the cost of maintaining such a machine being obviated and an increase in the yield of butter of nearly 10% is accomplished.

I claim:

A milk skimming device embodying a receptacle having a spout leading from its bottom portion, the bottom point of the outlet end of the spout being higher than the top portion of the inlet end of the spout and a shield detachably connected to the inner end of the spout and disposed over the same but in spaced relation to the bottom of the receptacle and at either side thereof.

In testimony whereof, I affix my signature, in the presence of two witnesses.

HUGH C. HARRIS.

Witnesses:
CAESAR MASINI,
E. L. YOUNGBERG.

---

Copies of this patent may be obtained for five cents each, by addressing the "Commissioner of Patents, Washington, D. C."